(12) United States Patent
Jeong

(10) Patent No.: US 7,889,308 B2
(45) Date of Patent: Feb. 15, 2011

(54) LIQUID CRYSTAL DISPLAY DEVICE

(75) Inventor: Duk-Young Jeong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 133 days.

(21) Appl. No.: 11/819,870

(22) Filed: Jun. 29, 2007

(65) Prior Publication Data

US 2008/0002134 A1 Jan. 3, 2008

(30) Foreign Application Priority Data

Jun. 30, 2006 (KR) .................... 10-2006-0061597
Jun. 7, 2007 (KR) .................... 10-2007-0055705

(51) Int. Cl.
*G02F 1/1339* (2006.01)
(52) U.S. Cl. .................. 349/153; 349/122; 349/127
(58) Field of Classification Search ............. 349/122, 349/127, 153
See application file for complete search history.

(56) References Cited

U.S. PATENT DOCUMENTS

| 6,392,735 | B1* | 5/2002 | Tani ........................... 349/156 |
| 6,466,294 | B1* | 10/2002 | Yamagishi et al. .......... 349/155 |
| 6,473,147 | B1* | 10/2002 | Nakahara et al. ............ 349/153 |
| 2002/0005928 | A1* | 1/2002 | Hanakawa et al. .......... 349/149 |
| 2002/0008815 | A1* | 1/2002 | Hanakawa et al. .......... 349/113 |
| 2004/0125321 | A1 | 7/2004 | Park et al. |
| 2006/0139553 | A1* | 6/2006 | Kang et al. .................. 349/149 |
| 2007/0097306 | A1* | 5/2007 | Jung et al. ................... 349/143 |
| 2007/0120152 | A1* | 5/2007 | Chang et al. ................. 257/270 |
| 2007/0139600 | A1* | 6/2007 | Lee et al. ..................... 349/153 |
| 2007/0268445 | A1 | 11/2007 | Chen et al. |
| 2008/0001864 | A1* | 1/2008 | Lee et al. ....................... 345/82 |
| 2008/0123013 | A1 | 5/2008 | Kim |

FOREIGN PATENT DOCUMENTS

| CN | 1335531 | 2/2002 |
| JP | 4217228 | 8/1992 |
| JP | 8179345 | 7/1996 |
| JP | 11-149087 | 6/1999 |
| JP | 2000284296 | 10/2000 |
| JP | 2005-234090 | 9/2005 |

* cited by examiner

*Primary Examiner*—Ellen Kim
(74) *Attorney, Agent, or Firm*—Morgan, Lewis & Bockius LLP

(57) ABSTRACT

A liquid crystal display module includes an observation region to allow a visual inspection be performed after bonding of the substrates for inspecting the sealant that may be otherwise blocked by the common voltage line. An embodiment of a liquid crystal display device includes a first electrode on a first substrate, a second electrode and a third electrode on a second substrate, the second electrode electrically contacting the first electrode at a first portion and the third electrode at a second portion, and including a transparent conductive material, a sealant attaching the first and second substrates together in a sealant region, the sealant between the first and second electrodes and the sealant including a plurality of conductive balls for electrically connecting the first and second electrodes, and a liquid crystal layer between the attached first and second substrates and within the sealant.

7 Claims, 9 Drawing Sheets

LIQUID CRYSTAL DISPLAY DEVICE

The invention claims the benefit of Korean Patent Application Nos. 10-2006-0061597 and 10-2007-055705 filed in Korea on Jun. 30, 2006 and Jun. 7, 2007, which are hereby incorporated by reference in their entirety.

BACKGROUND OF THE INVENTION

1. Field of the Invention

Embodiments of the invention relate to a liquid crystal display device, and more particularly, to a liquid crystal display device that allows effective visual inspections of a sealant and prevents defect generations in a sealant.

2. Discussion of the Related Art

Cathode Ray Tubes (CRTs), which are traditionally utilized as information display devices, have advantages in functions and cost, but have disadvantages in size miniaturization and portability. On the other hand, recent advancement in semiconductor technology has allowed liquid crystal display (LCD) devices to have better functions. In particular, LCD devices advantageously become smaller and lighter and consume low power, and accordingly receive attentions as replacement for overcoming the disadvantages of the CRTs. Thus, the LCD devices have gradually replaced CRTs and increasingly become as the preferred display device for information processing equipment in the recent times.

Generally, an LCD device includes a lower substrate having a thin film transistor and a pixel electrode thereon, an upper substrate having a color filter layer of red (R), green (G) and glue (B) colors thereon, and a liquid crystal layer interposed between the lower and upper substrates. Upon fabricating a liquid crystal panel by boning the lower and upper substrates, driving signal, e.g., gate signal, and data signal are applied to the liquid crystal panel region to generate an electric field on the pixel electrode, and the generated electric field twists liquid crystal molecules to adjust transmissivity of light emitted from a backlight, thereby implementing (displaying) images.

FIG. 1 is a plane view schematic diagram illustrating an LCD device according to the related art. As shown in FIG. 1, a plurality of gate lines 24 are arranged to cross a plurality of data lines 25 in a perpendicular manner on a lower substrate 10, thereby defining a plurality of pixel regions. A pixel electrode 23 is arranged in each of the plurality of pixel regions. A thin film transistor (TFT) which is a switching device is arranged at each intersection between the gate lines 24 and the data lines 25. Also, a gate pad 24a and a data pad 25a are electrically connected to one of the ends of the gate lines 24 and the data lines 25, respectively, to receive applied driving signal and data signal generated from a printed circuit board.

An upper substrate 40 has a common electrode (not shown) arranged at a region corresponding to an active region 21 of the LCD device and overlapping the pixel electrode. The common electrode receives a common voltage applied from an exterior via a common voltage line 30. The lower substrate 10 and the upper substrate 40 are bonded at their edges with a sealant 50.

FIG. 2 is an exploded view schematic diagram of region A shown in FIG. 1. As shown in FIG. 2, the sealant 50 is printed on the region on which the common voltage line 30 is located to form seal lines (shown by dashed lines). The sealant 50, which is used to bond the lower substrate 10 and the upper substrate 40, overlaps the common voltage line 30 (shown as shaded).

FIG. 3 is a cross-sectional view schematic diagram along I-I' of FIG. 1. As shown in FIG. 3, the common voltage line 30 is formed on the lower substrate 10. The sealant 50 is coated on the common voltage line 30 to bond the lower substrate 10 and the upper substrate 40 together. The sealant 50 contains conductive balls 56. The conductive balls 56 come in contact with the common voltage line 30 on the lower substrate 10 and the common electrode 44 on the upper substrate 40 and supply a common voltage signal applied to the common voltage line 30 to E the common electrode 44.

As such, the LCD device according to the related art employs the conductive balls 56 in the sealant 50 to supply the common voltage signal to the common electrode 44 on the upper substrate 40. Thus, the sealant 50 needs to overlap the common voltage line 30. However, the LCD device having such a structure may encounter the following problems.

An LCD device commonly undergoes an inspection for determining whether production defects are presented. The inspection commonly is performed not only in each production process but after the completion of the production process of the LCD device. Thus, the inspection of the sealant of the LCD device is performed not only at the sealant printing process but after the completion of the production process of the LCD device. During the inspection of the sealant at the sealant printing process, an assessment is made as to whether a preset amount of a sealant material has been printed.

In addition, the inspection of the sealant after the completion of the production process of the LCD device is performed on the sealant as it bonds the lower substrate 10 and the upper substrate 40 together. Thus, such an inspection of the sealant after the completion of the LCD production process is performed by a visual inspection. For example, the sealant is visually observed to inspect whether a line width of the sealant is non-uniform, whether the sealant has a crack or whether the sealant is partially separated.

However, the LCD device according to the related art employs the conductive balls in the sealant and has the sealant overlap the common voltage line. As a result, a visual inspection cannot be performed effectively on the sealant after the completion of the LCD production process due to the common voltage line formed of an opaque metal and the overlap between the common voltage line and the sealant.

SUMMARY OF THE INVENTION

Accordingly, embodiments of the invention is directed to a liquid crystal display device that substantially obviates one or more of the problems due to limitations and disadvantages of the related art.

An object of the embodiments of the invention is to provide a liquid crystal display device that allows effective visual inspections of a sealant and prevents defect generations in a sealant.

Another object of embodiments of the invention is to provide a liquid crystal display device capable of visually observing a line width of a sealant through an observation region in a common voltage line.

Another object of embodiments of the invention is to provide a liquid crystal display device capable of visually observing a sealant through a partially etching region in a common voltage line.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a first electrode on a first substrate, a second electrode and a third electrode on a second substrate, the second electrode electrically contacting the first electrode at a first portion and the third electrode at a second portion, and including a transparent conductive material, a sealant attaching the first and second substrates together in a sealant region, the sealant between the first and second electrodes and the sealant including a plurality of conductive balls for electrically connecting the first and second electrodes; and a liquid crystal layer between the attached first and second substrates and within the sealant.

In another aspect, a liquid crystal display device includes a first electrode on a first substrate, a second electrode on a second substrate, the first electrode facing the second electrode, a sealant attaching the first and second substrates together, the sealant including a plurality of conductive balls and an observation region, the conductive balls electrically connecting the first and second electrodes and the observation region corresponding to a region where the sealant extends substantially parallel to the first electrode and does not overlap the first electrode; and a liquid crystal layer between the attached first and second substrates and within the sealant.

In another aspect, a liquid crystal display device includes a first substrate including a pixel electrode and a common voltage line thereon, the common voltage line having a plurality of etched portions, a second substrate including a common electrode thereon, the common electrode facing the pixel electrode in an active region of the device, and a sealant attaching the first and second substrates together, the sealant including a plurality of conductive balls and the conductive balls in electrical contact with the common voltage line and the common electrode, wherein the etched portions of the common voltage line provide a visual view of the sealant from the first substrate.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
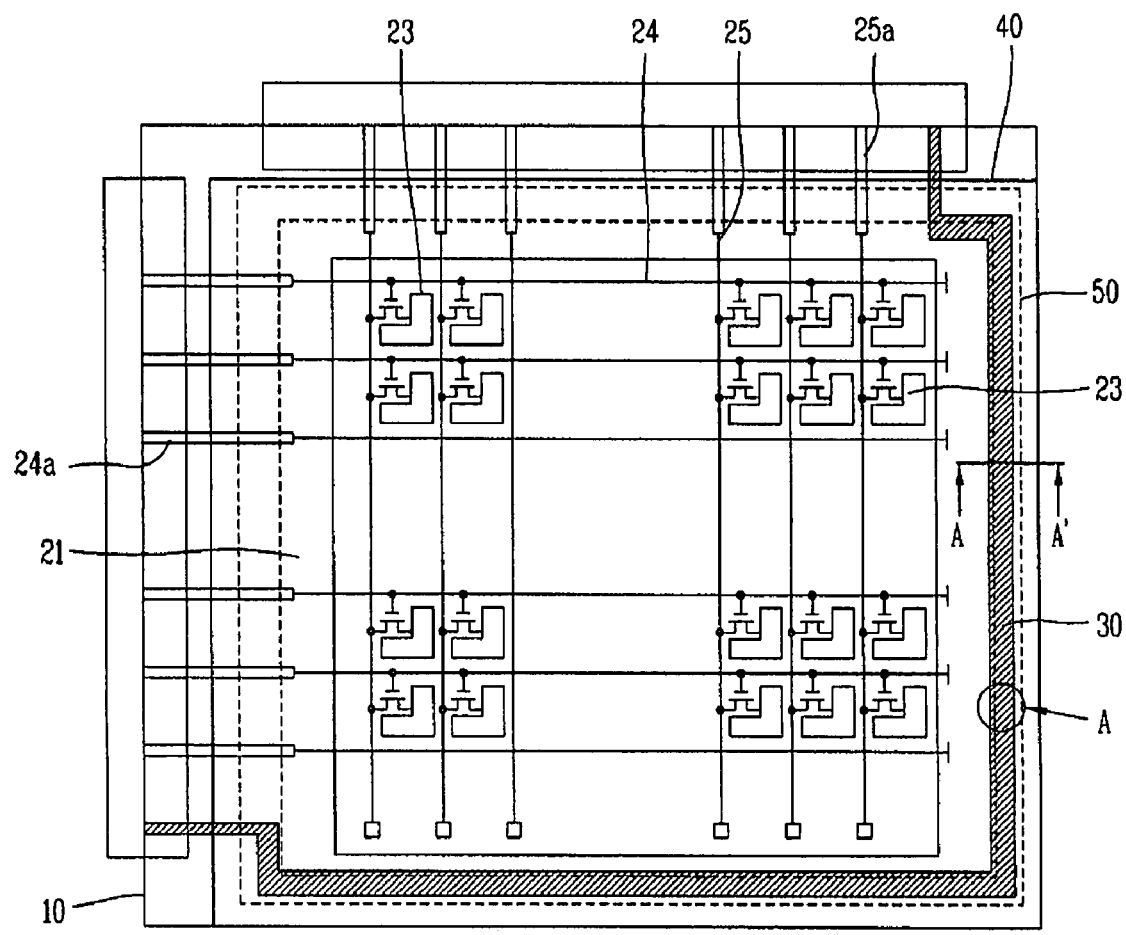
FIG. 1 is a plane view schematic diagram illustrating an LCD device according to the related art.
Figure 2:
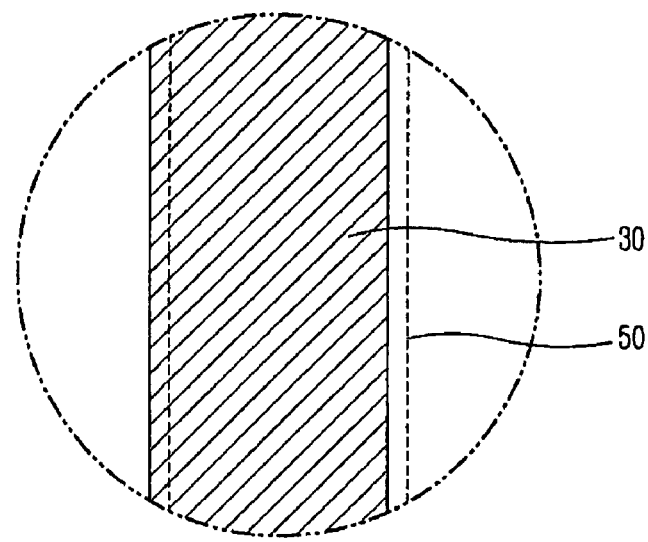
FIG. 2 is an exploded view schematic diagram of region A shown in FIG. 1.
Figure 3:
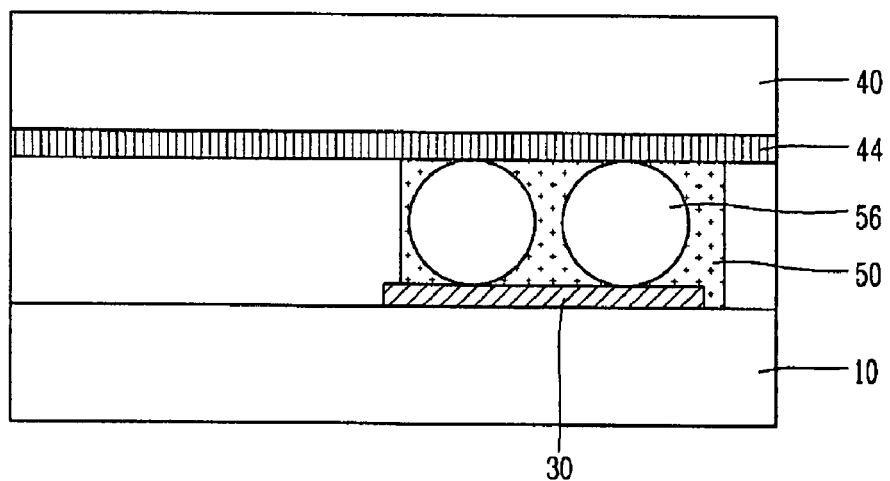
FIG. 3 is a cross-sectional view schematic diagram along I-I' of FIG. 1.
Figure 4A:
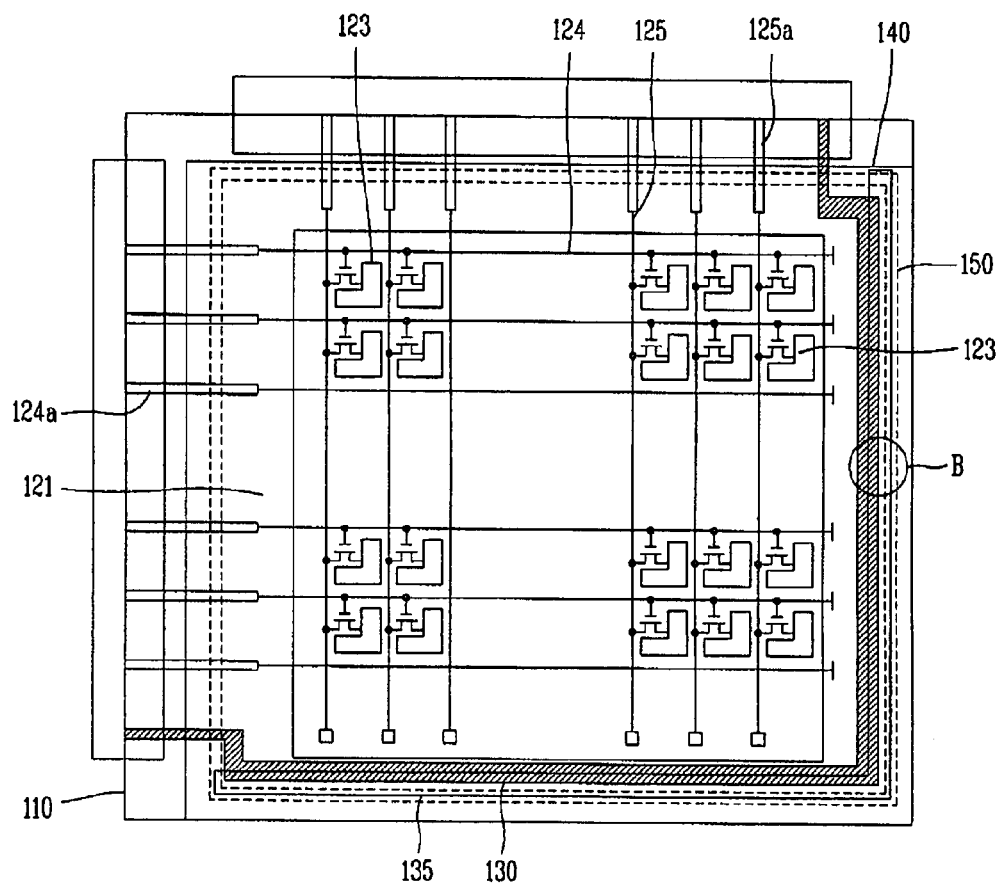
FIG. 4A is a plane view schematic diagram illustrating an LCD device in accordance with a first embodiment of the invention.
Figure 4B:
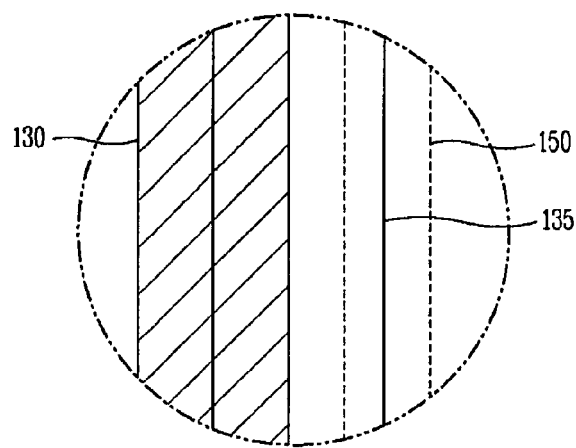
FIG. 4B is an exploded view schematic diagram of region B shown in FIG. 4A.

FIGS. 4A and 4B are plane view schematic diagram illustrating an LCD device in accordance with a first embodiment of the invention. In FIG. 4A, an LCD device includes a lower substrate 110, an upper substrate 140 and a liquid crystal layer (not shown) interposed between the lower and upper substrates 110 and 140. The lower substrate 110 is bonded onto the upper substrate 140 by a sealant 150. The sealant 150 may be printed or coated by a screen printing method or a dispensing method on one or both of the lower substrate 110 or the upper substrate 140.

The lower substrate 110 includes a plurality of gate lines 124 and data lines 125 arranged thereon and defining a plurality of pixel regions. The lower substrate 110 also includes pixel electrodes 123 arranged therein the pixel regions and a thin film transistor (TFT) arranged in each of the pixel regions. Accordingly, by applying a signal to the TFT from the exterior via the gate lines 124, the TFT is controlled to selectively apply an image signal inputted via the data line 125 to the pixel electrode 123.

Also, a gate pad 124a and a data pad 125a are electrically connected to one of the ends of the gate lines 124 and the data lines 125 to supply signals from the exterior to the gate lines 124 and the data lines 125, respectively. The upper substrate 140 includes a common electrode (not shown) arranged at an active region 121 of the LCD device and facing the pixel electrodes 123 in each pixel region. A common voltage is applied to the common electrode via a common voltage line 130 to form an electric field across the common electrode and the pixel electrode 123.

Although not shown detail in figure, a gate tap carrier package (TCP) and a data TCP are attached to the lower substrate 110. The gate TCP and the data TCP respectively have a gate driving IC and a data driving IC mounted therein. The gate TCP and the data TCP respectively supply a scanning signal and an image signal to a gate pad 124a and a data pad 125a arranged on the lower substrate 110. Also, the data TCP 180b may further include various circuits, such as a common voltage generating circuit. The common voltage generating circuit is electrically connected to the common voltage line 130 on the lower substrate 110 to apply a common voltage to the common voltage line 130.

In addition, the common voltage line 130 is arranged along two edges of the lower substrate 110. Alternatively, the common voltage line 130 may be arranged differently, for example, along three edges or all edges of the lower substrate 100. Further, the sealant 150 is arranged on edges of one or both of the lower substrate 110 and the upper substrate 140 to bond the lower and upper substrates 110 and 140 together.

As shown in FIG. 4B, the common voltage line 130 is apart from the sealant 150 in the predetermined distance and a conductive line 135 is disposed between the common voltage line 130 and the sealant 150 so that the conductive line 135 is overlapped with at least a part of the common voltage line 130 and the sealant 150. The conductive line 135 is made of a transparent material such as a indium tin oxide and a tin zinc oxide.

The sealant 150 is connected to the common electrode on the upper substrate 140 and contains a plurality of conductive balls. The conductive line 135 is overlapped and connected with the common voltage line 130 and the sealant 150 and thus the common voltage supplied to the common voltage line 130 is applied to the common electrode of the upper substrate 140 through the conductive line 135 and the sealant 150. At that time, since the conductive line 135 has a width broader than that of the sealant 150, the conductive line 135 may be overlapped with the whole area of the sealant 150 or a part of the sealant 150.

Since the conductive line 135 is transparent, it is possible to observe the sealant 150 corresponding to the conductive lien 135 by the operator's eye. That is, the operator can observe the shape of the sealant 150 by his eye to detect the width and inferiority of the sealant 150.

The sealant 150 is disposed on the conductive line 135 to connect the sealant 150 with the conductive line 135. Further, the common voltage line 130 is formed on the different layer from the conductive line 135 and connected to the conductive line 130 through a contact hole formed in the insulating layer between the common voltage line 130 and the conductive line 135.

Figure 5:
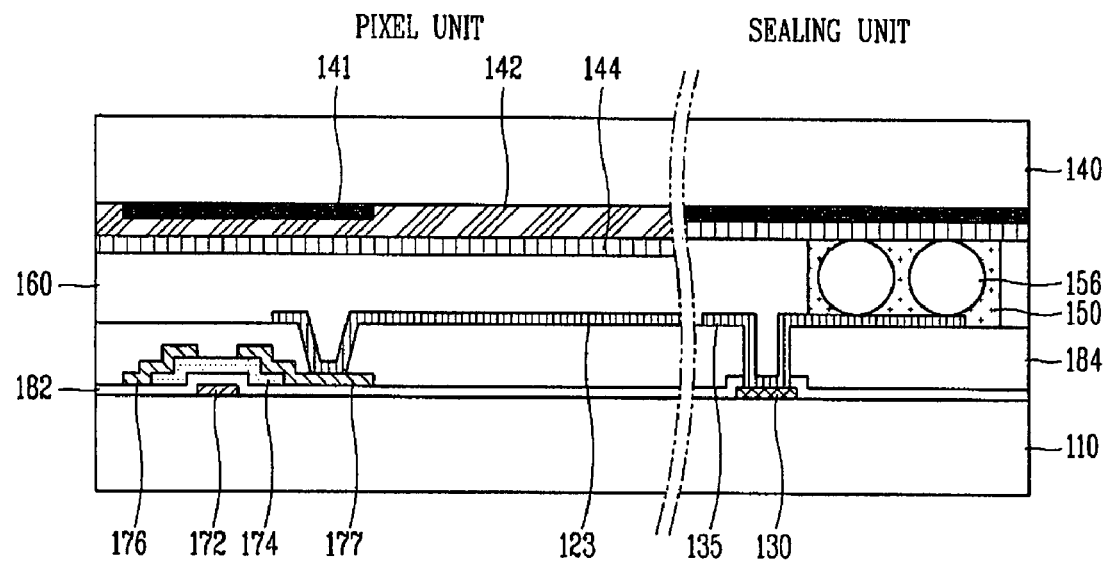
FIGS. 5 and 6 are sectional views showing the structure of pixel of the first embodiment of present LCD device.
Figure 6:
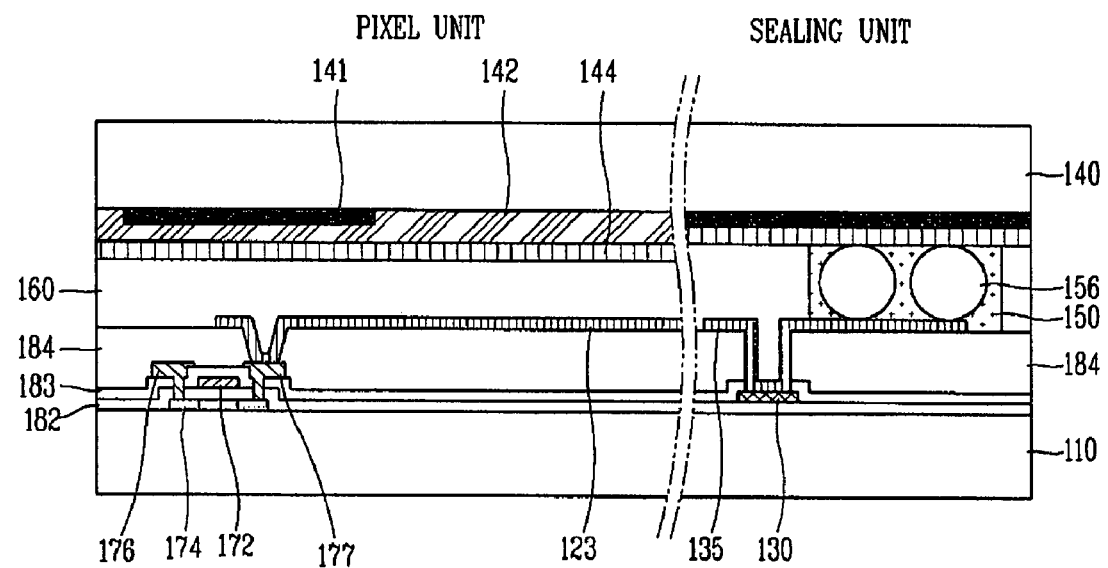

FIGS. 5 and 6 are sectional views showing the LCD device according to the first embodiment of the present invention. At this time, FIG. 5 indicates the LCD device having a TFT (thin film transistor) of bottom gate type and FIG. 6 indicates the LCD device having a TFT of top gate type. In figures, the LCD device is divided into pixel unit and sealing unit for convenience.

Referring to FIG. 5, the LCD device includes a lower substrate 110 and an upper substrate 140. On the lower substrate, a gate electrode 172 is formed in the pixel unit and the common voltage line 130 is formed in the sealing unit. The gate electrode 172 and the common voltage line 130 may be made by the different processes. However, it is proper to form the gate electrode 172 and the common voltage line 130 with same metal by the same process.

A gate insulating layer 182 is formed on the lower substrate 110 and a semiconductor layer 174 such as a-Si is formed on the gate insulating layer 182 in the pixel unit. Further, a source electrode 176 and a drain electrode 177 are formed on the semiconductor layer 174, and a passivation layer 184 is formed on the whole area of the lower substrate 184.

On the passivation layer 184, a pixel electrode 123 is formed in the pixel unit and the conductive line 135 is formed on the sealing unit. The pixel electrode 123 and the conductive line 135 may be formed by the different processes. However, it is proper to form pixel electrode 123 and the conductive line 135 with same material such as indium tin oxide and indium zinc oxide by the same process. Contact holes are formed in the passivation layer 184 at the pixel unit and sealing unit, so that the pixel electrode 123 is connected to the drain electrode 177 through the contact hole of the passivation layer 184 in the pixel unit and the conductive line 135 is connected to the common voltage line 130 through the contact hole of the passivation layer 184 in the sealing unit.

In the sealing unit, the sealant 150 is formed. Since the sealant 150 is formed on the common voltage line 130, the conductive ball 156 contained in the sealant 150 is contacted with the common voltage line 130 to connect electrically the conductive ball 156 to the common voltage line 130. Although the a part of sealant 150 is overlapped and connected with the common voltage line 130, the common voltage line 130 may be formed in the width larger than from that of the sealant 150 to overlap the common voltage line 130 with the whole width of the sealant 150.

A black matrix 141 is formed in the pixel unit and the sealing unit on the upper substrate 140. The black matrix is disposed in the non-display region such as TFT forming region, the gate line region, and the data line region to block the light through the non-display region. A color filter layer 142 is formed on the upper substrate 140 and a common electrode 144 made of the transparent material such as indium tin oxide and indium zinc oxide on the color filter layer 142 of the pixel unit and the black matrix 141 of the sealing unit.

The lower and upper substrates 110 and 140 are attached each other by the sealant 150 of the sealing unit and a liquid crystal layer 160 is formed between the lower and upper substrates 110 and 140.

The conductive ball 156 in the sealant 150 is contacted with the common electrode 144 in the sealing unit. Thus, the common voltage line 130 in the lower substrate 110 is connected to the common electrode 144 in the upper substrate 140 through the conductive line 135 and the conductive ball 156. When the common voltage is supplied from the outer driver (not shown), the common voltage is applied to the common voltage 144 of the upper substrate 140 through the common voltage line 130, the conductive line 135, and the conductive ball 156 to generate the electric field between the common electrode 144 and the pixel electrode 123.

In this embodiment, the transparent conductive line 135 is disposed between the common voltage line 130 and the sealant 150 to connect the conductive line 135 to the common voltage line 130 and the sealant 150. Thus, since the sealant 150 is overlapped with the transparent conductive line 135, not the opaque common voltage line 130, the shape of the sealant 150 may be observe by the operator through the transparent conductive line 135 and as a result the width and inferiority of the sealant 150 can be detected.

We will describe the TFT of top gate type in the FIG. 6 as follow. At this time, the description for the structure shown in FIG. 5 will be omitted.

As shown in FIG. 6, the semiconductor layer 174 is formed in the pixel unit on the lower substrate 110. The semiconductor layer 174 is formed with a poly-crystalline silicon (p-Si) or the a-Si. An impurities are injected in the both sides of the semiconductor to form an ohmic contact layer.

The gate insulating layer 182 is formed on the whole area of the lower substrate 110. A gate electrode 172 is formed in the pixel unit on the gate insulating layer 182 and the common voltage line 130 is formed in the sealing unit on the gate insulating layer 182. The gate electrode 172 and the common voltage line 130 may be made by the different processes. However, it is proper to form the gate electrode 172 and the common voltage line 130 with same metal by the same process.

Over the lower substrate 110 on which the gate electrode 172 and the common voltage line 130 are formed, an interlayer 183 is deposited. The source electrode 176 and the drain electrode 177 are formed in the pixel unit on the interlayer 183 and the passivation layer 184 is formed over the whole area of the lower substrate 110. The source electrode 176 and the drain electrode 177 are connected to the semiconductor layer 174 through the contact hole formed in the gate insulating layer 182 and the interlayer 183.

On the passivation layer 184, the pixel electrode 123 is formed in the pixel unit and the conductive line 135 is formed in the sealing unit. The pixel electrode 123 and the conductive line 135 which are formed with the transparent material such as the indium tin oxide or the indium zinc oxide are respectively connected to the drain electrode 177 and the common voltage line 130 through the contact holes formed in the passivation layer 184.

The black matrix 141 is formed in the pixel unit and the sealing unit on the upper substrate 140 and the color filter layer 142 is formed in the pixel unit on the upper substrate 140. Further, the common electrode 144 which is made of the transparent material such as the indium tin oxide and the indium zinc oxide is disposed on the color filter layer 142 in the pixel unit and on the common electrode 144 in the sealing unit.

In the sealing unit on the lower substrate 110, the sealant 150 is formed to attach the lower and upper substrates 110 and 140. The sealant 150 is disposed on the common voltage line 130, so that the conductive ball 156 of the sealant 150 is contacted with the conductive line 135 of the lower substrate 110 and the common electrode 144 of the upper substrate 140 to connect electrically the common voltage line 130 and the common electrode 144.

In this embodiment, since the sealant 150 is overlapped with the transparent conductive line 135, not the opaque common voltage line 130, the shape of the sealant 150 may be observed by the operator through the transparent conductive line 135 and as a result the width and inferiority of the sealant 150 can be detected.

Figure 7:
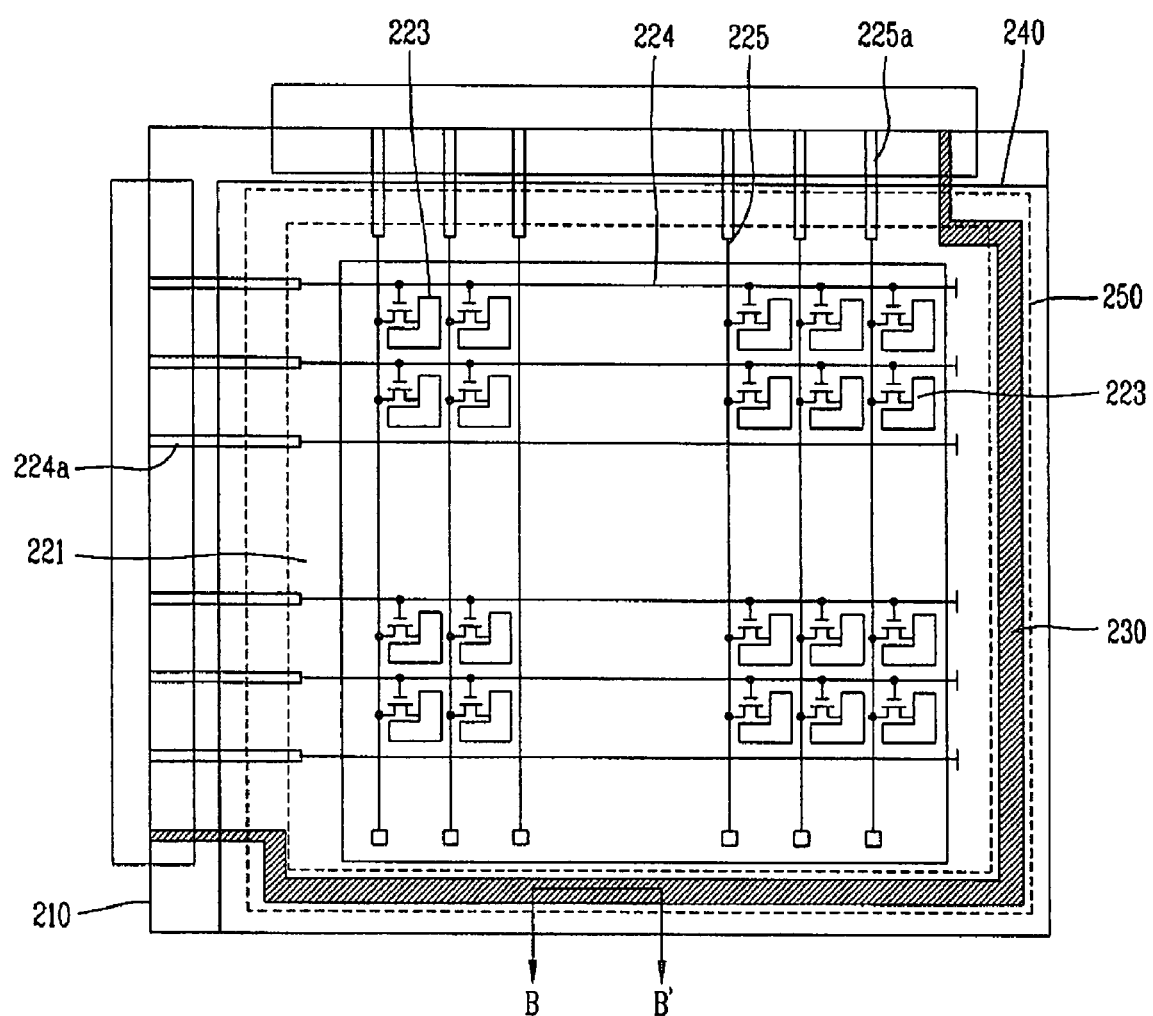
FIG. 7 is a plane view schematic diagram illustrating an LCD device in accordance with a second embodiment of the invention.

FIG. 7 is a view showing the LCD device according to the second embodiment of the present invention. At this time, we will describe only the different structure from the first embodiment, not the same element as the first embodiment.

Figure 8A:
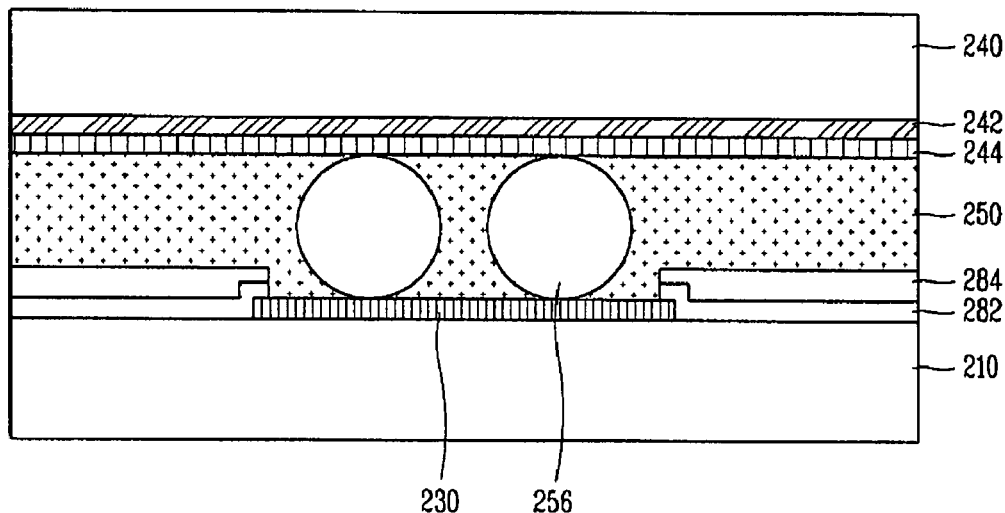
FIGS. 8A and 8B are sectional views showing the structure of sealing unit of the second embodiment of the present LCD device.
Figure 8B:
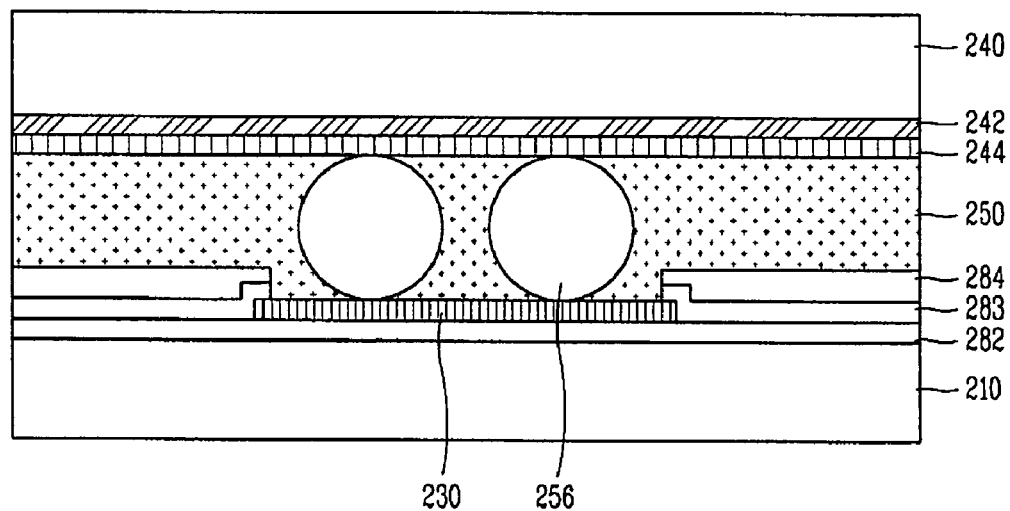

As shown in FIG. 7, in this embodiment, the common voltage line 230 is made of the transparent material and directly contact with the sealant 250. That is, the common voltage line 230 is superposed with the sealant 250. Since the common voltage line 230 is made of the transparent material such as the indium tin oxide or the indium zinc oxide, the shape of the sealant 250 may be observed by the operator through the transparent common voltage line 230. FIGS. 8A and 8B are the sectional views along B-B' line of FIG. 7 showing the structure of the sealing unit of the LCD device. At this time, FIG. 8A indicates the LCD device having a TFT (thin film transistor) of bottom gate type and FIG. 8B indicates the LCD device having a TFT of top gate type.

As shown in FIG. 8A, in the LCD device having TFT of bottom gate type, the common voltage line 230 made of the transparent conductive material is formed on the lower substrate 210. At this time, the gate insulating layer 282 and the passivation layer 284 upper the common voltage line 230 is removed to expose the common voltage line 230. The sealant 250 is formed on the expose region of the common voltage line 230. The conductive ball 256 of the sealant 250 is contacted with the common voltage line 230 and the common electrode 244 in the upper substrate 240 to connect electrically the common voltage line 230 and the common electrode 244. Thus, the common voltage supplied to the common voltage line 230 is applied to the common electrode 244 through the conductive ball 256.

As shown in FIG. 8B, in the LCD device having TFT of top gate type, the common voltage line 230 made of the transparent conductive material such as the indium tin oxide and the thin zinc oxide is formed on the gate insulating layer 282. At this time, the interlayer 283 and the passivation layer 284 upper the common voltage line 230 is removed to expose the common voltage line 230. The sealant 250 is formed on the expose region of the common voltage line 230, so that the common voltage line 230 is electrically connected to the common electrode 244 by the conductive ball 156.

Since the transparent common voltage line 230 is contacted with the sealant 250, the shape of the sealant 250 may be observed by the operator through the transparent common voltage line 230.

In this invention, as described above, the transparent common voltage line is directly connected to the sealant or the opaque common voltage line is connected to the sealant though the transparent conductive line to apply the common voltage to the common electrode. Thus, the sealant 250 may be detected through the transparent layer, i.e., the common voltage line or the conductive line.

Also, the observation of the sealant may be performed after bonding the lower substrate and the upper substrate together. For example, after the completion of the fabrication process of a liquid crystal display module, the line width of the sealant is inspected in an overall module inspection process.

Accordingly, although the line width of the sealant may pass an inspection at the sealant printing process, if the inspection made after the completion of the fabrication process of the LCD module finds the line width being less than a preset line width or any line-width defect is generated at the line width (e.g., introduction of foreign material or cracks or holes on a coated sealant), the complete LCD module would be determined as a defective one. As a result, the product undergoes a more stringent inspection and defects in finished products are prevented.

Figure 9:
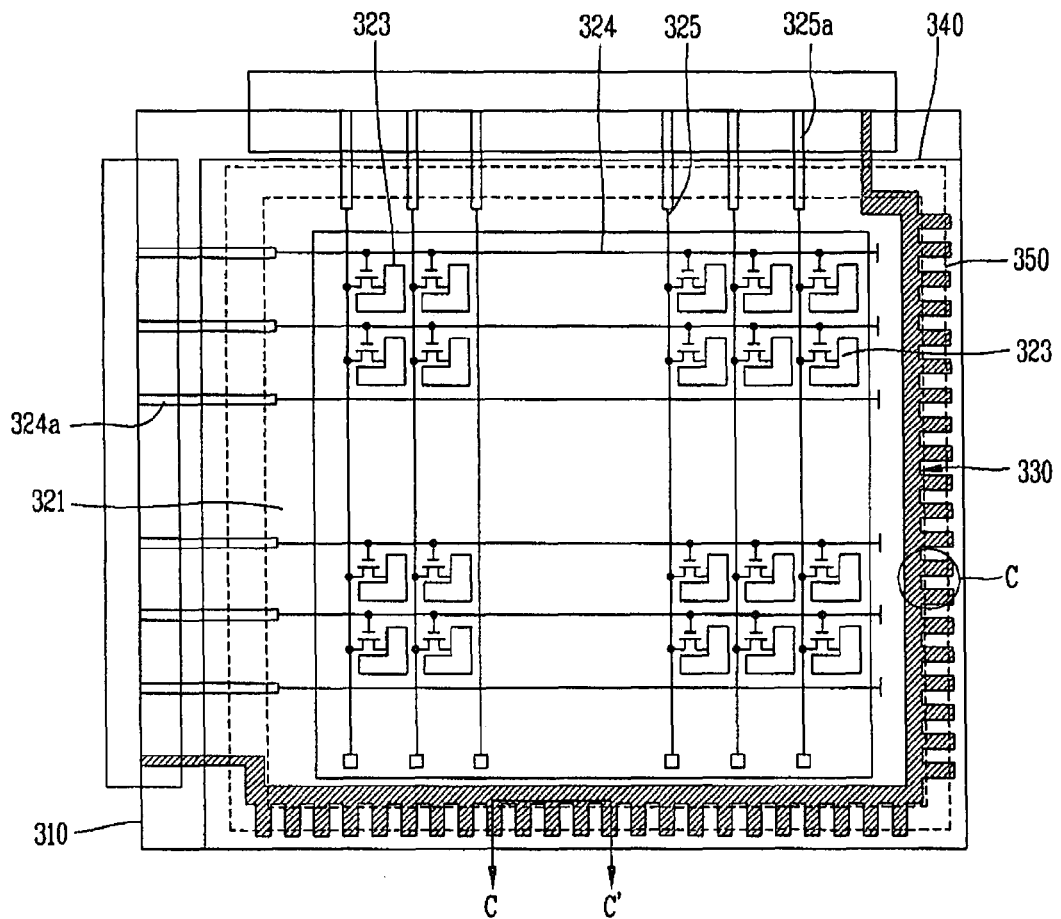
FIG. 9 is a plane view schematic diagram illustrating an LCD device in accordance with a third embodiment of the invention.
Figure 10:
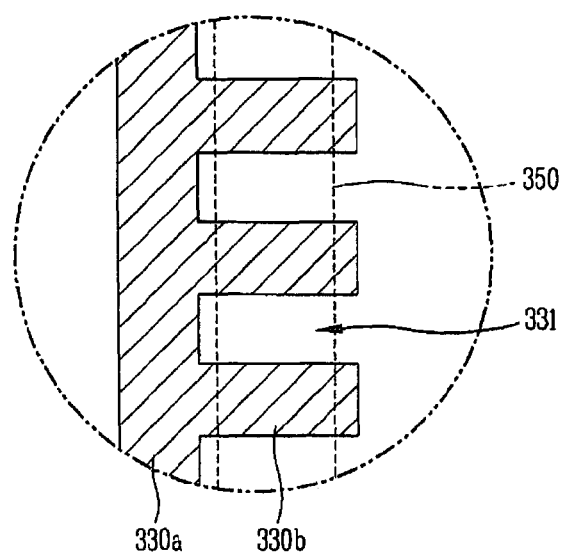
FIG. 10 is an exploded view schematic diagram of region C shown in FIG. 9.

FIG. 9 is a plan view showing the LCD device according to the third embodiment of this invention and FIG. 10 is an partially enlarged plan view of C-region of FIG. 9. In this embodiment, the common voltage line is made of the opaque metal and directly contacted with the sealant. In order to observe the shape of the sealant, in this invention, the window for observing the sealant is formed in the opaque common voltage line. This structure is described in detail as follow.

As shown in FIG. 9, the common voltage line 330 is formed along two sides, three sides, or all sides of the lower substrate 310, and the sealant 350 is formed in the outside of the lower and upper substrates 310 and 340 to attach thereof. The common voltage line 330 is made of opaque metal and the sealant 350 is overlapped with a part of the common voltage line 330.

As shown in FIG. 10, the common voltage line 330 includes a plurality of protrusions 330b protruded from a main common voltage line portion 330a. The sealant 350 is arranged on the common voltage line 330 and overlaps the common voltage line 330. The sealant 350 has a width smaller than that of the protrusions 330b so that the sealant 350 is entirely overlapped with the protrusions 330b. At this time, the sealant 350 can be formed in the width larger than that of the protrusions 330b so that the sealant 350 can be overlapped with the a part of the main common voltage line 330a and the protrusions 330b.

The conductive ball in the sealant 350 is contacted with the protrusions 330b to connect electrically the common voltage line 330 to the sealant 350 and a result the common voltage is applied to the common electrode in the upper substrate 340.

The protrusions 330b may be arranged with a preset width and a preset interval. Therefore, the LCD device according to this embodiment of the invention, unlike an LCD device of the related art, includes an opening, in the common voltage line 330, where no metal or an opaque material is disposed. The opening may correspond to a region between two protrusions 330b of the common voltage line 330. In addition, the opening forms a transmittable region to allow visual inspections, for example, a region for inspecting a line width of the sealant 350 that is arranged on the common voltage line 330. Accordingly, an operator can visually observe the shape of the sealant 350 through the opening, thereby inspecting the line width of the sealant 350 and any defect generation.

Figure 11A:
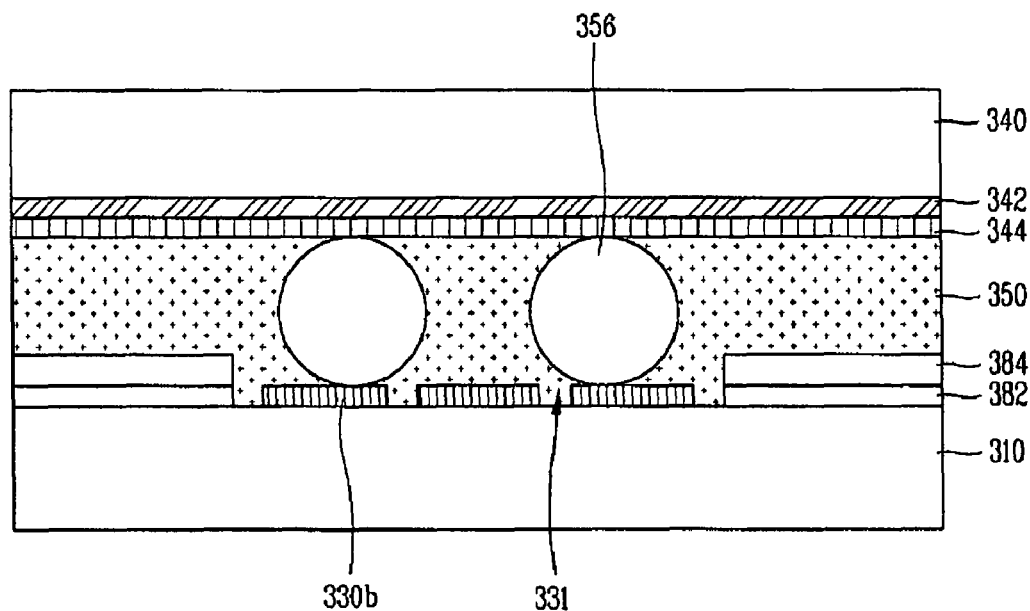
FIGS. 11A and 11B are sectional views showing the structure of sealing unit of the third embodiment of the present LCD device.
Figure 11B:
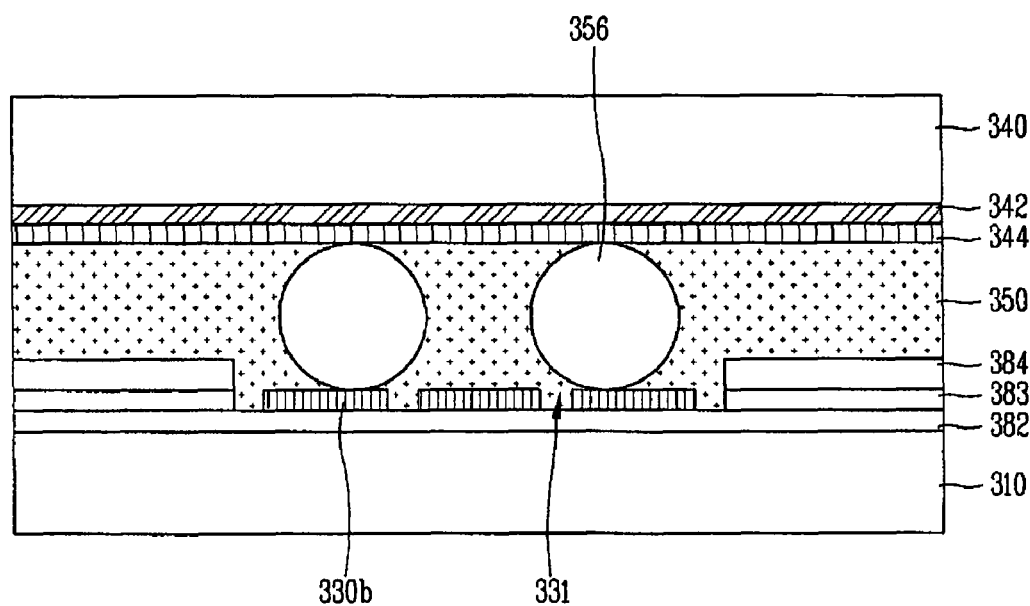

FIGS. 11A and 11B are sectional views along line C-C' of FIG. 10. At that time, FIG. 11A indicates the LCD device having a TFT (thin film transistor) of bottom gate type and FIG. 11B indicates the LCD device having a TFT of top gate type.

As shown in FIG. 11A, in the LCD device of the bottom gate type, the protrusions 330b of the common voltage line 330 is formed on the lower substrate 310. Although not shown, the main common voltage line 330a connected to the protrusions 330b is formed on the lower substrate 310. Since, the common voltage line 330 may be formed of the same metal as the source and drain electrodes and by the same fabrication process. For example, the protrusions 330b and the main common voltage line 330a can be formed by laminating a metal of an uniform width and then partially etching the laminated the metal by a photolithography.

The gate insulating layer 382 and the passivation layer 384 over the protrusions 330b are removed to expose the protrusions 330b and the sealant 350 is formed on exposed protrusions 330b so that the conductive ball 356 of the sealant 350 is contacted with the protrusions 330b. Further, the conductive ball 356 is contacted with the common electrode 344 in the upper substrate 340. Thus, the common voltage line 330 is connected to the common electrode 344 through the conductive ball 356 of the sealant 350.

As shown in FIG. 11B, in the LCD device of the bottom gate type, the protrusions 33ob are formed on the gate insulating layer 382 and the interlayer 383 and the passivation layer 384 on the protrusions 330b are removed to expose the protrusions 330b. The sealant 350 is disposed on the exposed protrusions 330b to contact the conductive ball 356 of the sealant 350 with the protrusions 330b and as a result the common voltage line 330 is electrically connected to the common voltage.

As described above, the third embodiment of the invention includes a light-transmittable observation region 331 formed by partially etching the common voltage line 330 and a visual inspection of the sealant 350 can be made through the observation region 331 in the common voltage line 330.

In embodiment, the sealant 350 is directly overlapped with the opaque common voltage line 330 to connect electrically the common voltage line 330 in the lower substrate 310 to the common electrode 344 in the upper substrate 340. At this time, the protrusions 330b of the common voltage line 330 is connecting line for connecting the common voltage line 330 and the common electrode 344 and the main common voltage line 330a is a voltage applying line to which the voltage is applied.

In this embodiment, the observing region 331 is formed in the opaque common voltage line 330 to observe the shape of the sealant 350 through the observation region 331. Thus, this embodiment is applicable to the modifications having the various structure if the observation region is provided to the common voltage line.

Figure 12A:
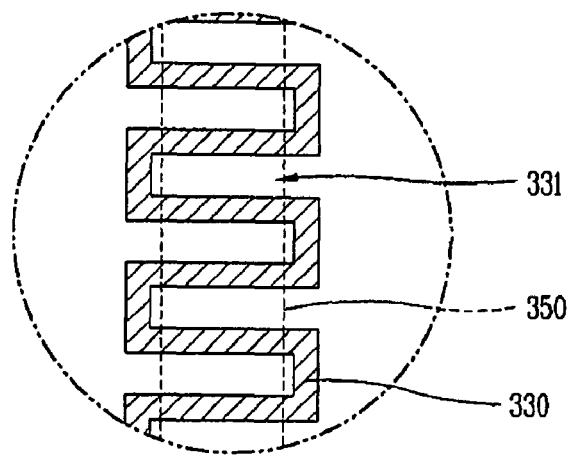
FIG. 12A-12C are views showing the modifications of the third embodiment of this invention.
Figure 12B:
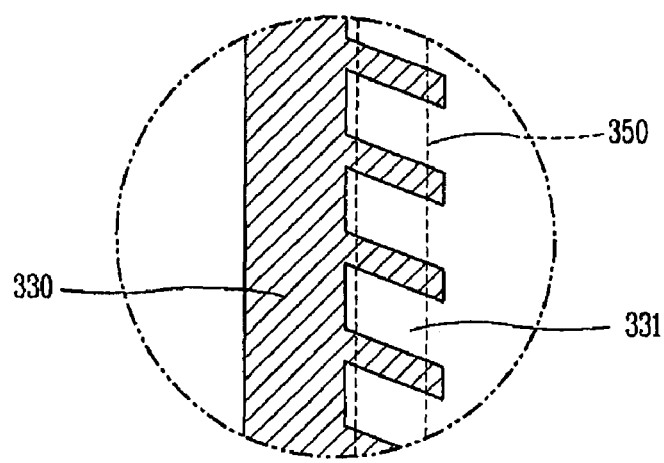
Figure 12C:
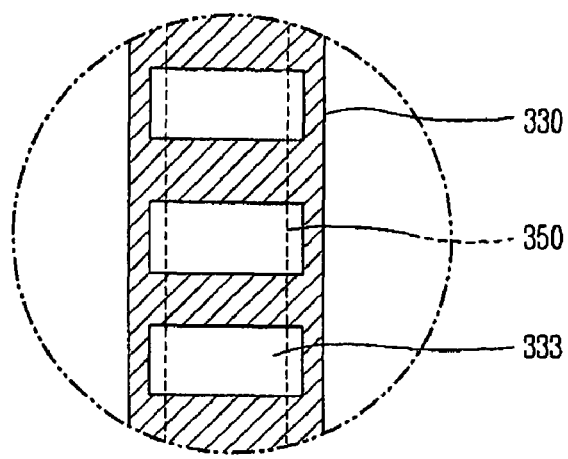

FIG. 12A-12C are views showing the modifications of the third embodiment of this invention.

As shown in FIG. 12A, the common voltage line 330 may be formed in a zigzag shape with a certain width. The common voltage line 330 includes an observation region 331 between the changes of the line direction to allow a visual observation of a sealant 350 printed on the common voltage line 230.

As shown in FIG. 12B, protrusions of the common voltage line 330 may be arranged at non-perpendicular with respect to the main line direction. The common voltage line 330 includes an observation region 331 between two protrusions to allow the visual observation of the sealant 350 printed on the common voltage line 330.

As shown in FIG. 12C, the common voltage line 330 includes a plurality of windows 332 within its main line portion. The common voltage line 330 includes the window to allow the visual observation of the sealant 350 printed on the common voltage line 330. The window 332 may be formed in a rectangular shape as shown in FIG. 7C, but may have other shapes, such as a circular shape or a triangular shape.

As described above, according to an embodiment of the invention, the common line is made of transparent material or includes a plurality of protrusions and observation regions. Alternatively, according to an embodiment of the invention, a transparent electrode electrically connects conductive balls of the sealant and the common voltage line in regions where the sealant and the common voltage line extend parallel to one another. As such, according to an embodiment of the invention, an LCD module includes an observation region to allow a visual inspection of a sealant that may be otherwise blocked by the common voltage line. Thus, according to an embodiment of the invention, an effective visual inspection of a sealant can be performed after the completion of the fabrication process of an LCD module and an LCD module having a fabrication defect, such as a bonding defect or sealant linewidth defect, can be detected, thereby preventing weak bonding of the substrates or liquid crystal leakage.

The line shapes shown in figures are merely exemplary. For example, the common voltage line according to an embodiment of the invention may have a different structure from those shown in the figures. Therefore, an embodiment of the invention may not be limited to the illustrated shapes, but can also be implemented in various shapes. In addition, the detailed explanation described above has been provided for a certain LCD device, but the present invention may not be limited to the LCD device having the construction as shown. The present invention may be applicable to LCD devices in which a common electrode is formed on an upper substrate and a common voltage is applied to the common electrode via conductive balls contained in sealant.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device comprising:
 a first substrate and a second substrate;
 a sealant between the first and second substrates to attach the first and second substrates together the sealant and the sealant including a plurality of conductive balls:
 a plurality of data lines and gate lines disposed perpendicularly from each other to define a plurality of pixel regions in a inner portion from the sealant on the first substrate;
 a thin film transistor disposed in each pixel region in the inner portion from the sealant on the first substrate;
 a first electrode on the first substrate through the sealant region;

a third electrode on the first substrate in a inner area from the sealant on the first substrate, the third electrode being apart from the sealant in the predetermined distance;

a second electrode on the first substrate, the second electrode being overlapped with a part of the sealant and the third electrode, the second electrode being formed with transparent conductive material;

a liquid crystal layer between the attached first and second substrates and within the sealant, wherein the second electrode is overlapped with the third electrode at the inner portion that the pixel regions are disposed.

2. The device according to claim 1, wherein the third electrode is directly on the first substrate.

3. The device according to claim 1, wherein the third electrode is on at least one insulating layer.

4. The device according to claim 1, wherein the second electrode contacts the third electrode through a contact hole in at least one insulating layer on the first substrate.

5. The device according to claim 1, wherein the second electrode electrically connects the conductive balls of the sealant and the third electrode.

6. The device according to claim 1, wherein the second electrode is in a region where the sealant and the third electrode extend substantially parallel to one another.

7. The device according to claim 1, wherein the first and third electrodes include a non-transparent conductive material.

* * * * *